US 9,798,712 B2

(12) United States Patent
Xu et al.

(10) Patent No.: US 9,798,712 B2
(45) Date of Patent: Oct. 24, 2017

(54) PERSONALIZED MEDICAL RECORD

(75) Inventors: Beilei Xu, Penfield, NY (US); Stuart A. Schweid, Pittsford, NY (US); Raja Bala, Webster, NY (US); Rinku Gajera, Kamataka (IN)

(73) Assignee: XEROX CORPORATION, Norwalk, CT (US)

( * ) Notice: Subject to any disclaimer, the term of this patent is extended or adjusted under 35 U.S.C. 154(b) by 737 days.

(21) Appl. No.: 13/609,541

(22) Filed: Sep. 11, 2012

(65) Prior Publication Data
US 2014/0075295 A1 Mar. 13, 2014

(51) Int. Cl.
G06F 5/16 (2006.01)
G06F 17/24 (2006.01)
G06F 17/28 (2006.01)

(52) U.S. Cl.
CPC .......... G06F 17/248 (2013.01); G06F 17/289 (2013.01)

(58) Field of Classification Search
CPC .. G06F 17/211; G06F 17/30; G06F 17/30053; G06F 17/2264; G06F 17/30017; G06F 17/30247; G06F 17/3074
USPC .......... 715/243, 273, 714, 716, 727
See application file for complete search history.

(56) References Cited

U.S. PATENT DOCUMENTS

| 6,307,550 B1 * | 10/2001 | Chen ................ G06F 17/30811 345/418 |
| 6,463,205 B1 | 10/2002 | Aschbrenner et al. |
| 7,460,731 B2 | 12/2008 | Senftner et al. |
| 7,669,127 B2 * | 2/2010 | Hull ................ G06F 17/30038 715/716 |
| 7,962,640 B2 * | 6/2011 | Lee ................ H04N 21/23424 345/672 |
| 8,539,344 B2 * | 9/2013 | Hull et al. ................ 715/255 |
| 2003/0061607 A1 * | 3/2003 | Hunter ................ B82Y 10/00 725/32 |
| 2004/0019648 A1 | 1/2004 | Huynh et al. |
| 2006/0007243 A1 | 1/2006 | Miller |
| 2007/0248226 A1 * | 10/2007 | Chong ................ H04N 21/2383 380/200 |
| 2008/0184288 A1 * | 7/2008 | Lipscomb ................ G06Q 30/02 725/32 |
| 2008/0251575 A1 | 10/2008 | Bowling et al. |
| 2009/0080855 A1 | 3/2009 | Senftner et al. |

(Continued)

FOREIGN PATENT DOCUMENTS

JP 2001156975 6/2001
WO WO85/03152 7/1985

OTHER PUBLICATIONS

U.S. Appl. No. 13/150,450, dated Jun. 1, 2011, Xu et al.
(Continued)

Primary Examiner — Scott Baderman
Assistant Examiner — Hassan Mrabi
(74) Attorney, Agent, or Firm — Fay Sharpe LLP

(57) ABSTRACT

The present disclosure provides a method of producing a personalized medical record, comprising: sensing capabilities of a receiving device; retrieving stock information; retrieving personalized information; combining at least a portion of the stock information and at least a portion of the personalized information into the personalized record; formatting the personalized record based on a combination of the capabilities of the receiving device and a user's preference; and, transmitting the formatted personalized record to the device.

28 Claims, 2 Drawing Sheets

(56) References Cited

U.S. PATENT DOCUMENTS

| | | | |
|---|---|---|---|
| 2009/0164564 A1* | 6/2009 | Willis | 709/203 |
| 2009/0238538 A1* | 9/2009 | Fink | 386/83 |
| 2011/0023063 A1 | 1/2011 | McDonough et al. | |
| 2011/0167110 A1* | 7/2011 | Hoffberg et al. | 709/203 |
| 2011/0179446 A1* | 7/2011 | Karaoguz | H04N 21/44016 725/32 |
| 2012/0079380 A1* | 3/2012 | Tsai et al. | 715/716 |
| 2012/0084435 A1* | 4/2012 | Vasa | G06F 17/30796 709/224 |
| 2012/0196260 A1* | 8/2012 | Nhiayi | G09B 5/06 434/317 |
| 2012/0257876 A1* | 10/2012 | Gupta | G11B 27/034 386/285 |
| 2012/0310665 A1 | 12/2012 | Xu et al. | |
| 2013/0066623 A1* | 3/2013 | Chou | G06F 17/289 704/2 |
| 2013/0294745 A1* | 11/2013 | Xu | H04N 5/76 386/241 |

OTHER PUBLICATIONS

U.S. Appl. No. 13/462,867, dated May 3, 2012, Xu et al.

"Unity Medical Announces New iPad Application to be Piloted by Leading Hospitals", Business Wire, Apr. 5, 2010, www.businesswire.com/news/home/20100405005570.

"Interactive Health Tutorials", MedlinePlus, Apr. 18, 2012, www.nlm.nih.gov/medlineplus/tutorial.html.

Das, Dipanjan, Martins, André F.T., "A Survey on Automatic Text Summarization", Language Technologies Institute, Carnegie Mellon University, Nov. 21, 2007, pp. 1-31.

\* cited by examiner

PERSONALIZED MEDICAL RECORD

CROSS REFERENCE TO RELATED PATENTS AND APPLICATIONS

U.S. patent application Ser. No. 13/150,450, filed Jun. 1, 2011, entitled "PERSONALIZED MEDICAL RECORD," by Xu et al. is incorporated herein by reference in its entirety.

U.S. patent application Ser. No. 13/462,867, filed May 3, 2012, entitled "CREATION OF CUSTOMIZATION/PERSONALIZED VIDEO FROM LARGE STOCK AUDIO/VISUAL DATABASES" by Xu et al. is incorporated herein by reference in its entirety.

BACKGROUND

The present disclosure pertains generally to methods for creating electronic personalized multimedia files, and more specifically to creating a personalized record and electronic file incorporating user-supplied personal information that consists of digital images, information, data, audio, and video combined with stock information and/or synchronized further with audio recordings. The method for creating the personalized record further comprises sensing the capabilities of a receiving device and formatting the content appropriately.

Personalized videos described in the public domain can concern various applications. For example, production of personalized video stories can include unfinished stories that are first recorded on a video medium with blank segments. Digital sequences can be used to complete the segments, for example, by portraying a character with a keyed-out facial area, and then using the digitized image of a subject to complete the character. A plurality of different stories may be prerecorded, each substantially completed but including a plurality of unfinished segments. The stories may include animation, for example in the form of cartoons, with personalizing components being recorded onto the previously uncompleted file or tape in such a way that a smooth, visual transition is realized at the start and ending of each segment.

Other applications can include a personalized system that combines user-supplied data and digital visual images or stored archival stock video footage and popular music works of the last century to generate a personalized life story documentary movie. The personalized system gathers input from the user, such as age, gender, and allows the user to upload personal digital images, video, and other electronic files. The user inputs dates of each image or video uploaded so that the personalized video system can chronologically order the items. The personalized system can combine the user-supplied information and digital media with archived stock video and/or audio footage of significant events and famous personalities to place the recipient's life story in historical context. The personalized system can also provide a music soundtrack and synchronizes the display of the digital media and archived footage to the selected soundtrack. One embodiment allows the user to upload birth certificates, marriage certificates, newspaper clippings or other digitally scanned material for use in the system. Another embodiment allows the user to record or upload a voiceover narrative, sound effects or other audio content.

In still another application, a system can be deployed at a theme park for capturing and managing personalized video images, e.g., for creating personalized video products for patrons at the theme park. The system includes an RFID system to track patron movements around the park, a camera system to capture video images at designated locations around the park, a computer-based video content collection system to collect and store personalized video clips of patrons, and a video product (e.g., DVD) creation and point of sale system to create the end product for sale to the patron.

What is needed is a cost-effective method to provide a record of general and specific information that a user can (on demand) update, maintain, review, access and/or share remotely with concerned parties. The disclosure below describes a method for personalizing and sharing record information wherein the system can sense or detect the capabilities of a receiving device and format the content accordingly.

SUMMARY

The present disclosure provides a method of producing a personalized record. The method comprises: sensing capabilities of a receiving device; retrieving stock information; retrieving personalized information; combining at least a portion of the stock information and at least a portion of the personalized information into the personalized record; formatting the personalized record based on a combination of the capabilities of the receiving device and a user's preference; and, transmitting the formatted personalized record to the device.

The present disclosure further provides a method of producing a personalized medical record. The method comprises: sensing capabilities of a receiving device; retrieving stock information; retrieving personalized information; compiling at least a portion of the stock information, at least a portion of the personalized information, and at least one incomplete segment into the personalized record; formatting the personalized record based on the capabilities of the receiving device wherein the capabilities of the receiving device override a user's preference; and, transmitting the formatted personalized record to the device.

The present disclosure still further provides for a system for producing a personalized medical record, comprising: a receiving device including detectable capabilities wherein the receiving device retrieves stock information and personalized information. The system compiles at least a portion of the stock information, at least a portion of the personalized information, and at least one incomplete segment into the personalized record. The system further formats the personalized record based on the detectable capabilities of the receiving device wherein the detectable capabilities of the receiving device overrides a user's preference, and transmits the formatted personalized record to the receiving device. The stock information can include at least one predeterminable insertion point within incomplete segments for combining into the personalized information. The system provides the personalized information at the at least one predeterminable insertion point for combining with the at least a portion of the stock information for producing the personalized record. The detectable capabilities of the receiving device can be based on an internet bandwidth capability.

As further described herein, the term personalized electronic record or file refers to a personalized related story, i.e. record, video story, and/or history.

DETAILED DESCRIPTION

Figure 1:
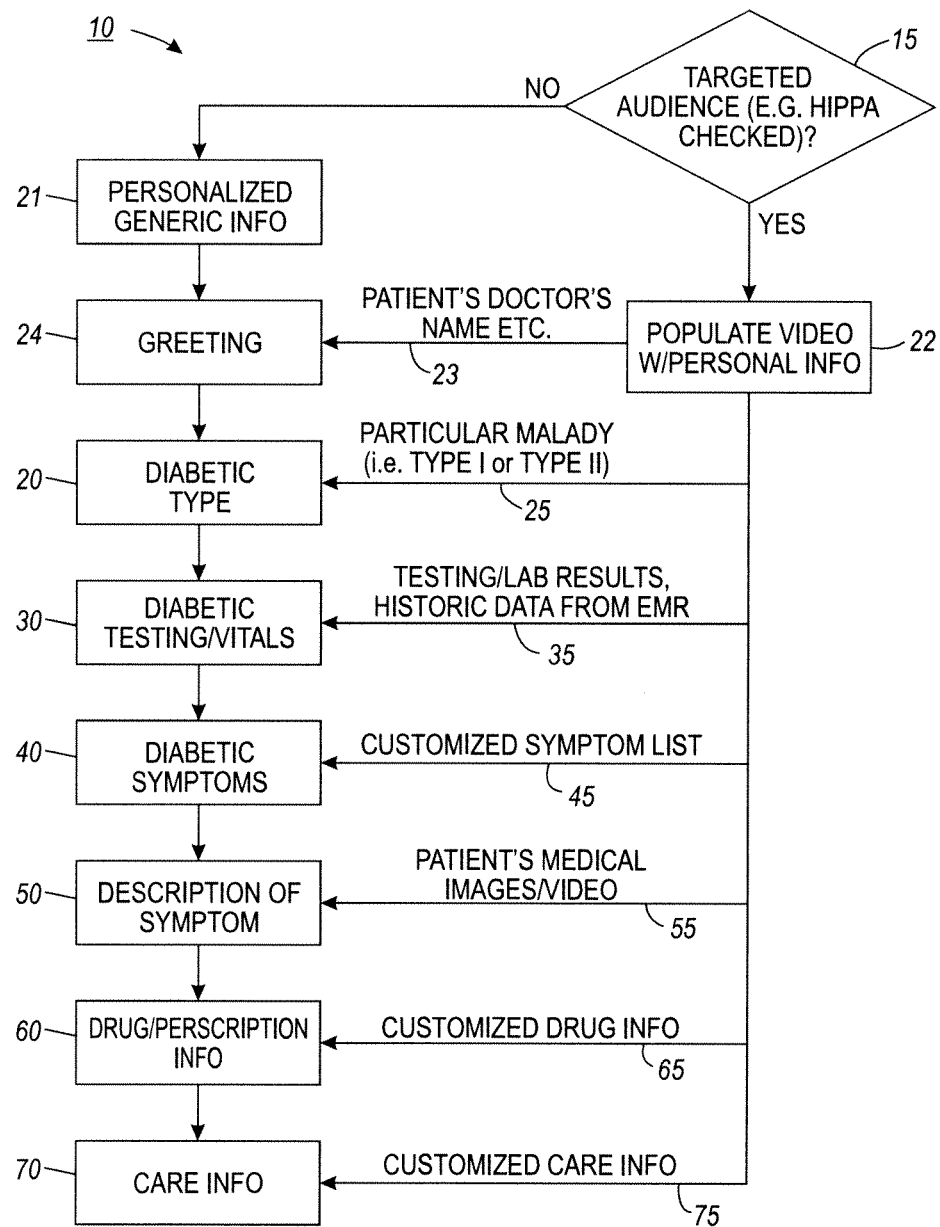
FIG. 1 shows, in highly schematic form, an outline of a personalized medical video tutorial for an individual and an associated malady; and, FIG. 2 illustrates various exemplary media conversions that can be incorporated into the system based on device capabilities and limitations.

A method and system according to the present disclosure, efficiently and effectively provides personalized information by sensing and/or detecting the capabilities of a receiver's device and then formatting the personalized content appropriately. In the healthcare domain, it enables the healthcare practitioner to explain the patient condition by customizing and personalizing the content individually. The process can reduce non-value added time required from healthcare provider while increasing knowledge and awareness of patients, caregivers, and collaborators. The automatic scalability enables the content to be viewed in different media types based on user's choice and/or device limitation.

The present disclosure, in one exemplary embodiment, describes a system that generates personalized medical video on demand to provide healthcare information. It can combine stock videos with the details of a given patient's specific condition and treatment to provide the customized/personalized care information. The personalized video can be shared with patients by giving them a hardcopy DVD or an access to a hosting server. However, as cell and smart phone usage becomes more ubiquitous around the world, it is of great utility to provide the personalized information in a form that is easily accessed using a cell or smart phone or any other media type based on a user's choice or device capabilities. Accessing video is often not feasible with cell phones especially when the bandwidth is limited (e.g., developing countries where 3G or 4G network isn't available). Hence, it is desirable to be able to transform personalizable content from, for example, full video to text and or to story board/audio depending on the network access and the device type at the point of use by sensing and/or detecting the receiver's device capabilities and formatting the content appropriately. It is to be appreciated that the present disclosure can be applied to domains including but not limited to education, sales and marketing, security/surveillance, where there is a need to send multimedia based content to multiple scalable points of use.

It is expensive to provide standard healthcare information via personal interactions with a well-paid healthcare professional. Many videos exist that describe all types of maladies and treatments than can be used to convey standard information. On the other hand, the details of a given patient's specific condition and treatment will not be provided in a standard video and must be conveyed in some personal manner. Medical information can be too sophisticated and detailed for a patient to fully understand and retain from a one-time discussion with a healthcare professional, especially if they lack the relevant background or are under the stress of their condition or treatment. Details may not be accurately remembered or accurately shared with other interested parties such as family members, other care takers, insurance providers, and legal parties.

Medical tutorial videos currently in the public domain are both plentiful and readily available. The tutorial videos can be tagged and generically transformed into a usable format (i.e. generic format). The generic transformation can include an off-the-web video analyzer that analyzes the videos that a content creator (i.e. doctor) may be interested in based on his/her preferred tags or profiles. The preferred tags or profiles create a ready pool of videos for the user. What is needed is a cost-effective way to provide general and specific healthcare information that a patient can view multiple times and share with concerned parties. However, full video can sometimes be a challenge to view/upload when user's bandwidth is limited, especially through cell phones in developing countries such as India where 3G or 4G network is not available and the end-users receiving the content may own or have access to disparate devices. Furthermore, users often have their personal preferred media types to review and store the content.

The present disclosure provides for scalable personalized content, and method to produce the content, that is scalable based on output requirements using a content creation tool such as a scripting language, AVISynth or Adobe® After Effects® Scripting tool. Personalized information can be created from various components and combined with stock information using a video scripting language. Once the script is generated either implicitly or constructed from prompts such as a Graphical User Interface (GUI) or a query interface, either video or a lower bandwidth form (e.g., a text document) can be generated depending on the receiver's device capabilities and formatting the content appropriately. For example, if the bandwidth allows, a full video is produced based on the scripting language, and when the bandwidth is very limited, a text-based document is formulated with text automatically generated from the audio track in the video with inserted pictures taken from marked-frames from the video. The text document can then be viewed as a web-page or a hardcopy print out. Other intermediate bandwidth forms can be similarly generated. For example, video segments can be replaced by a slide show with audio track or highly compressed to reduce bandwidth requirements.

A script or storyboard written either directly or constructed from prompts through the GUI or a query interface serves as the backbone to construct the flow of the content (i.e., sequencing components together). For example, a personalized record or video for a diabetic patient might have the outline 10 shown in FIG. 1. The outline 10 can include several generic components (e.g., stock videos) in the record or video such as medical diagnosis (i.e. diabetes) 20, type of diabetic test and associated lab work 30, symptoms 40, description of typical symptoms 50, drug/prescription information 60, and care information 70. The components can be chosen by the content generator such as a doctor or a nurse or required by the content user such as a patient. The flow can then be defined manually with inputs from the content generator or user (e.g. medical knowledge from a doctor) or automatically based on time sequence, geographic location, or cause-effect relationship of the components.

For a personalized record or video intended for example, a target audience 15, a generated script can comprise not only links, flow, and descriptions of stock video components (i.e., start and stop time from a stock video clip), but also how and where personalized and generic information 21 is combined, merged, inserted, overlaid, replaced, or parameterized, which can then be merged into the stock video. The points of insertion, overlay, replacement, and parameters of a video can be stored in the metadata with the video components (e.g., MPEG4 supports extensive metadata definition) or personalized components that will be integrated. The personalized components can include text, tables, graphs, still images, video segments, and audio tracks. Those components can be extracted from a database, electronic medical record (EMR), or stored in a structured database for easy retrieval. These videos can be automatically created for a patient based on certain patient tags or profiles of conditions/symptoms documented in a centralized physician order entry (CPOE) or EMR, of which users can view and approve/edit as necessary.

In particular, personalized components can populate the record 22 with a patient's doctor's name 23, a greeting 24, a specific malady type 25 (i.e. Type I or Type II), testing/lab results (and other historic data from a patient's EMR) 35, customized symptom list 45, a patient's medical images 55, a patient's customized drug information 65, and a patient's customized care information 75.

Figure 2:
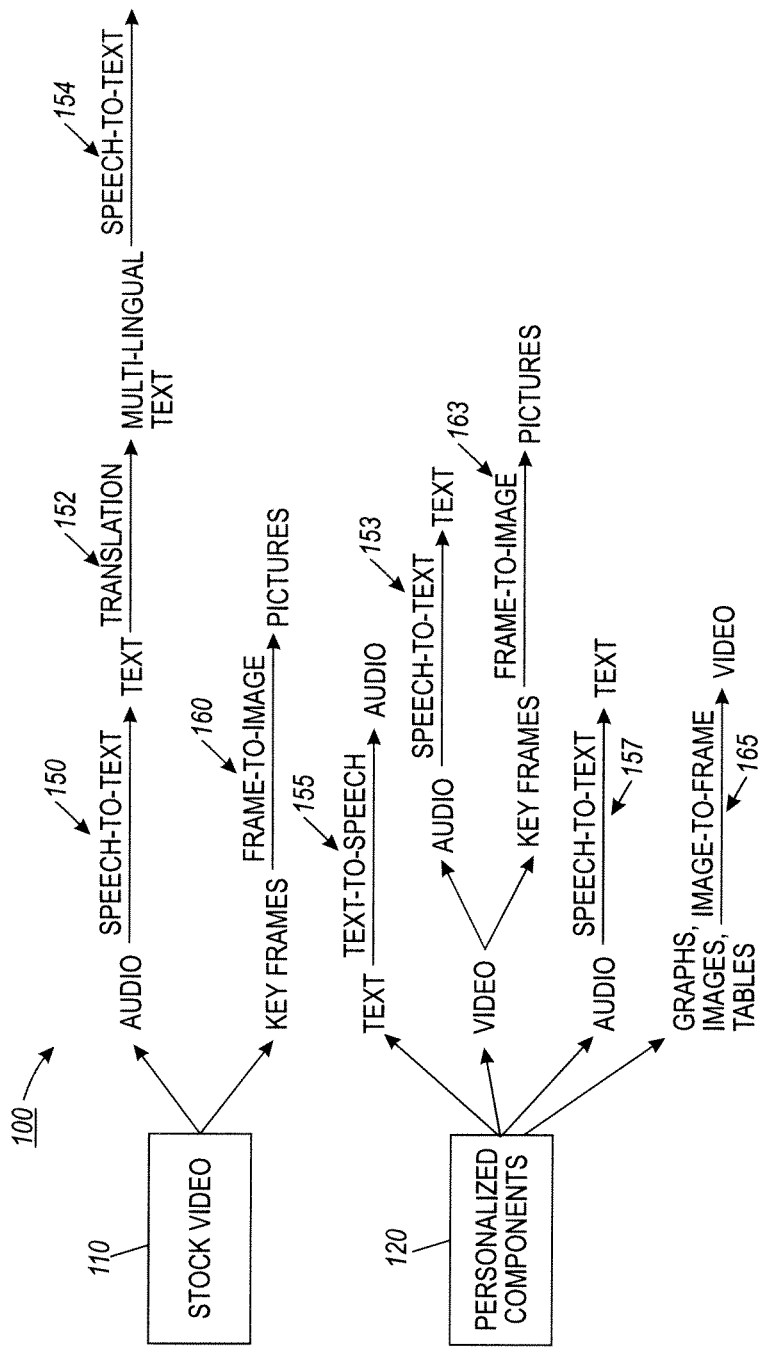

Once the outline or script 10 is constructed, the output format can then be selected by a user in the form of a full video, story board, text/audio only or some format in between. The system may override a user's preference and send the content based on user's current Internet bandwidth and device capability. FIG. 2 shows content 100 in different media that can be extracted from stock video 110 and personalized components 120. The different media can then be configured and combined at various stages to create personalized content in different formats as described in the exemplary embodiments of FIG. 2 and the description hereinafter.

1) Full video:
Based on the script, a full video can be generated real time with no dependence on an Integrated Development Environment (IDE) using a video scripting language such as AVISynth. It provides great efficiency gains over existing direct approach and enables large numbers of personalization—unfeasible with direct method. The incorporated video segments can be in any video format such as AVI, MPEG or in the script format such as AVS, which can then be easily stored and transferred and can be viewed as video with AVISynth. The video can be shared through hardcopy DVD's or streamed/hosted on a server.

2) Storyboarding with audio track:
In some cases when full video is difficult to upload or view over a slow network access (e.g., web meeting), a slide show with audio track can be generated based on the video. Title and key frames from each video components (e.g., defined in the left side in FIG. 1) can be extracted to form a set of slides. The corresponding audio track is attached to the slide show and timers are set based on the length of the audio track.

3) Text document with pictures or webpages with links to videos:
When bandwidth is very limited, e.g., developing countries such as India where 3G or 4G network isn't available, and cell phone access is the primary method for accessing remote information, text documents (text-based webpage) can be created where the audio tracks (e.g., way files) from all video segments are converted to text through speech-to-text, which can also be translated into multiple languages for multi-lingual outputs. Some key frames from stock video segments and personalized frames, e.g., medical x-rays, tables and graphs of lab results, can be extracted from the video stream and inserted as pictures in the text document. It is noted that once the audio tracks associated with segment of video are converted into a text file, the entire text file can be stored as metadata with the video file (e.g. MPEG4) to be searchable based on keyword. In addition to the title pictures, hyperlinks to each of the video segment can be inserted so that video can still be viewed when bandwidth is increased. The text document can be formatted using PostScript or Latex, which can be derived from the script that generates the full video.

4) Audio only:
When bandwidth is very limited or based on user's preference (i.e. blind patients), an audio track can be generated where all text information is converted into audio and translated if needed with appropriate segments/components so that the user doesn't have to manually go to desired components.

5) Text summary only:
In the case of extremely stringent resource constraints, the content can be summarized into short text segments to be sent via e.g., SMS to the patient's mobile device. Automated text summarization technology can be leveraged for this purpose.

The information from the GUI can be converted to parameters (e.g., location of the insertion or overlay, length of the insertion or overlay, appearance of the insertion or overlay) used by AVISynth to assemble the script that produces the scalable personalized content. The latter can then be sent to patients or other parties who have permission to access the information either through a web link to a hosting website or hardcopy or DVDs or audio or mobile SMS. It can also become a component in a patient's electronic medical record.

As described above, the present disclosure provides, in one exemplary embodiment, for a personalized record/electronic file, and method to produce the record/video, that can combine stock tutorial medical record/video information 110 with personalized information and/or maladies for a specific patient 120. Personalized information 120 can include patient identification, inserted, overlaid, or parameterized information (still images, video, audio, text or graphics, etc.), historical sequence of images, differences from normal or previous states (range of motion, shape, size, texture, etc.), and instructions for therapy and/or treatment.

The present disclosure provides hardware apparatus, medical video stories, and methods whereby a pre-recorded stock video may be personalized by combining live or digitally captured images to segments of the pre-recorded stock video. In addition to personalized imagery, the system, which will subsequently be described in detail, is adaptable to the inclusion of personalized health information, diagnostics, and/or treatments either automatically streamed from EMR or entered manually. The system is additionally capable of including captioning such as an individual's name or other information as part of the personalization of the underlying medical record.

There are several ways in which the personalized medical record can be created. One could start with a standard stock video, prerecording, or medical record information. Stock or 'canned' videos can be created in a manner that readily allows personalization, such as fixed or predeterminable insertion points between frames and within frames. The frames can allow for video, pictorial, textual, and audio insertion. For example, blank areas can represent 'blank canvas' portions of the video or frames where information may be inserted. There can be known portions of the video or frames where movement or other features can be varied, augmented, personalized, and/or edited, etc. There can be a graphical user interface (GUI) that prompts (and enables) a practitioner to insert information in order to, for example, modify ranges, sizes, or qualities of a feature. The personalized medical record/video can be partially created using recorded information from a discussion with a practitioner and all other medical professionals encountered. The personalized medical electronic record/video can also be facilitated, for example, using components from a video scripting language such as AVISynth, where the script can be either written directly or can be constructed from prompts as a GUI input or a query interface. The video can also be created using video editing software, such as Adobe After Effects, or through GUI prompting.

Many prerecorded videos exist that describe all types of maladies and treatments that could be used to convey standard information for crafting the electronic personalized medical record. Albeit, the details of a given patient's specific condition and treatment will not be provided in a standard file or video and must be conveyed in some personalized manner. In many instances, medical information can be too sophisticated and detailed for a patient to fully understand from a one-time discussion, especially if they lack a relevant background or are under the stress of their condition or treatment. Details may not be accurately remembered, nor accurately or timely shared with other interested parties such as family members, other care takers, insurance providers, and legal parties. In other situations, lack of portability or accessibility prohibits sharing with interested parties.

A video camera can be used to capture the image of the person (e.g. the recipient's primary care physician) or object (e.g. the recipient's prosthetic device) to be used for personalization purposes. In the event that a flat image is to be used for such personalization, a camera may be replaced with another electronic device such as a scanner, graphical input device and so forth. The electronic capturing device can be interfaced to a central computer having a keyboard (not shown), the computer can be responsible for the various editing and control features necessary to carry out personalization associated with producing a final electronic record. The keyboard can be customized or replaced with any type of input device, including a touch screen, voice input, etc.

As outlined above, the present disclosure comprises a personalized electronic medical record/video, and method to produce the medical record/video, that combines stock prerecorded tutorial files with information personalized for a specific patient along with an associated malady or history. Personalized information can be inserted, overlaid, etc., and can include patient identification information, parameterized information (still images, video, audio, text or graphics, etc.), historical sequence of images, differences from normal or previous states (range of motion, shape, size, texture, etc.), and/or instructions for therapy. One could start with a standard stock video which has been prerecorded or created in a manner that readily allows personalization, such as fixed and/or predeterminable insertion points between frames and/or within frames. There can be "blank canvas" portions of the video, frames, or audio track where information may be inserted. The standard stock information is downloaded into the personalized medical record for editing. There can be known portions of the video frame sequence where movement or other features can be varied. There can be a GUI that prompts a practitioner to insert information or modify ranges, sizes, or qualities of a feature; and records audio and video information. The personalized file can be created and modified, for example, using recorded information from a discussion with a practitioner. The personalized medical record/video can be created from components using a video scripting language such AVISynth, where the script can be either written directly or constructed from prompts as a GUI input or a query interface. The record can also be created using, for example, video editing software, such as Adobe After Effects, or Microsoft® Movie Maker.

Electronic files can be created using a combination of stock video, personal information, and standard video editing tools. Additionally, one alternative method provides a mechanism where one or more stock videos and personal information can be assembled automatically. The method includes use of a GUI that allows specification of various parameters (e.g., range of motion), specification of graphics and various types of patient information (e.g. vitals or prescribed medications). It also can indicate insertion or modification points in the electronic file. As such, the two methods for creating the electronic file includes: (1) video editing software and, (2) automated assembly.

In addition to image, video, text, graphic insertion or overlays, audio files can be replaced or inserted to further personalize the video. One example of an audio file is reading the information on the slide for patients that choose to have it read. It could also be input as text, as spoken segments specifically for the video, or it could include audio recordings of conversations or sessions such as a radiologist speaking, i.e. doctor notes, on their findings regarding the particular image.

The personalized medical record/video can be constructed by one of several methods. A manual-level practitioner could write a script that uses a video scripting language, such as AVISynth. The script can be automatically generated using information from the GUI (variables). Running the script can play the video. Another manual creating method can directly edit the video using video editing software, such as Adobe After Effects.

In a more user-friendly system a video script for consumption by a video rendering system can be generated automatically using an interface program. The interface program would create a unique script by combining the user specific information parsed from a GUI presented to the user with a base or template script. The interface program would use information from the GUI input to set a collection of pre-defined variables or parameters of the application as well as generate user-specific code for including or excluding particular sections or effects. One method for setting the variables needed by the user created script is to generate a separate file that simply contains variable assignment statements written in the video scripting language. This file is then incorporated into the user created script using an import/include type command.

In one arrangement the method of producing a personalized record comprises: sensing capabilities of a receiving device; retrieving stock information; retrieving personalized information; combining at least a portion of the stock information and at least a portion of the personalized information into the personalized record; formatting the personalized record based on the capabilities of the receiving device; and, transmitting the formatted personalized record to the device. The stock information can include at least one predeterminable insertion point within incomplete segments for inserting into the personalized information. The method further provides the personalized information at the at least one predeterminable insertion point for merging with at least a portion of the stock information for producing the personalized record. The formatting can include generating text from audio/speech 150, 153, 157, for example. Alternatively, the formatting can include generating audio/speech from text 155, for example. The formatting can include generating marked frames from video 160, 163, or vice versa 165. The formatting can further include generating a slide show from the marked frames. The formatting can still further include accompanying the slide show with an audio track. And still further, the formatting can include generating text from speech 150, including translating speech 152 to a selected language and generating the text from the selected language 154. The capabilities of the receiving device can override a user's preference. The capabilities of the receiving device can be based on an internet bandwidth capability. The personalized record can be selected from the group consisting of a video clip, document, audio clip, slide set, and webpage. The combining can be selected from the group consisting of merging, inserting, overlaying, and replacing. The stock information and the personalized information are selected from the group consisting of video, audio, text, graphics, and images. The device is selected from the group consisting of SMS, phone, smartphone, tablet computer, laptop computer, desktop computer.

As described above, the present disclosure provides a method and process to create scalable personalized content based on the preferences/capabilities of a receiver's device and a content creation tool such as the video scripting language, AVISynth or text scripting language, PostScript® or Latex, for example. Personalized information can be created from various components and combined with stock videos using a content creation tool such as AVISynth. Once the script is generated either implicitly or is constructed from prompts such as a GUI or a query interface, either video or a lower bandwidth form (e.g., a text document or audio only file) can be generated depending on the receiver's device capabilities or users' preferences and formatting the content appropriately. For example, if the bandwidth allows, a full video is produced based on the scripting language using a video renderer. But, when the bandwidth is very limited, instead of a full video, based on the same scripting language, a text-based document is formulated with text automatically generated from the audio tracks in the video with options of inserting pictures taken from marked-frames from the video. The text document can then be viewed as a web-page or a hardcopy print out or SMS on a mobile device. Other intermediate bandwidth forms can be similarly generated, e.g., video segments can be replaced by a slide show with audio track or highly compressed to reduce the necessary bandwidth requirements.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of distributing a personalized record over a network to a remote receiving device, the method comprising:
    providing network access to an associated receiving device and sensing a capability of the associated receiving device;
    receiving personal information of a person at a central computer sent from an electronic device interlaced to the central computer, the central computer comprising a processor and a database that stores tags or profiles for creating stock information for the user, wherein the processor;
    selects the stock information based on the tags or profiles;
    generates a script that transforms the stock information into a usable format having insertion points for combining the personal information with generic information in the stock information;
    formats the script into a personalized record by combining the personalized information at the insertion points in the script;
    optionally scales the formatted personalized record into a different media type based on the sensed capability; and
    transmits the media over the network to the receiving device;
    wherein a scalability of the formatted personalized record into the different media type allows the personalized record to be transmitted to the associated receiving device and enables the personalized record to be viewed on the receiving device.

2. The method of claim 1, wherein the combining is selected from the group consisting of merging, inserting, overlaying, and replacing.

3. The method of claim 1, wherein the stock information is a video and wherein the processor scales the formatted personalized record by generating a slide show from marked frames of the video.

4. The method of claim 3, wherein the formatting further includes accompanying the slide show with an audio track from the video.

5. The method of 3, wherein the formatting further includes generating text from speech in the video.

6. The method of claim 5, wherein the formatting further includes translating the speech to a selected language and generating the text from said selected language.

7. The method of claim 1, wherein the capability of the receiving device overrides a user's preference.

8. The method of claim 7, wherein the capability of the receiving device is based on an Internet bandwidth capability.

9. The method of claim 1, wherein the personalized record is selected from the group consisting of: a video clip; document; audio clip; slide set; and a webpage.

10. The method of claim 1, wherein the stock information and the personalized information are selected from the group consisting of: video; audio; text; graphics; images; and, a combination of the above.

11. The method of claim 1, wherein the receiving device is selected from the group consisting of: SMS; phone; smartphone; tablet computer, laptop computer; desktop computer; and a combination of the above.

12. A method of distributing a personalized record over a network to a remote receiving device, the method comprising:
    providing network access to an associated receiving device and sensing an Internet bandwidth capability of the associated receiving device;
    receiving personal information of a person at a central computer sent from an electronic device interfaced to the central computer, the central computer comprising a processor and a database that stores tags or profiles for creating a pool of videos for the user, wherein the processor;
    selects a video based on the tags or profiles;
    generates a script that transforms the video into a usable format having insertion points for combining the personal information with generic information in the video;
    formats the script into a personalized video record by combining the personalized information at the insertion points in the script;
    optionally scales the formatted personalized video record into a different media type based on the sensed Internet bandwidth capability; and transmits the media over the network to the receiving device;
wherein a scalability of the formatted personalized video record into the different media type allows the personalized record to be transmitted to the associated receiving device and enables the personalized record to be viewed on the receiving device.

13. The method of claim 12, wherein the processor scales the formatted personalized video record by generating a slide show from said marked frames.

14. The method of claim 13 further comprising:
accompanying the slide show with an audio track.

15. The method of claim 12 further comprising:
generating text from speech in the video.

16. The method of claim 15 further comprising:
translating the speech to a selected language and generating the text from the selected language.

17. The method of claim 12, wherein the media is selected from the group consisting of a video clip, document, audio clip, slide set, and webpage.

18. The method of claim 12, wherein the combining is selected from a group consisting of merging inserting overlaying replacing; and a combination of the above.

19. The method of claim 12, wherein personalized information is selected from the group consisting of video, audio, text, graphics, and images.

20. A method of distributing a personalized record over a network to a remote receiving device, the method comprising:
providing network access to an associated receiving device and sensing a capability of the associated receiving device;
receiving personal information of a person at a central computer sent from an electronic device interfaced to the central computer, the central computer comprising a processor and a database that stores tags or profiles for creating a pool of videos for the user, wherein the processor;
selects a video based on the tags or profiles;
generates a script that transforms the video into a usable format having insertion points for combining the personal information with generic information in the video;
formats the script into a personalized video record by combining the personalized information at the insertion points in the script;
optionally scales the formatted personalized video record into a different media type based on the sensed capability; and
transmits the media over the network to the receiving device;
wherein a scalability of the formatted personalized video record into the different media type allows the personalized record to be transmitted to the associated receiving device and enables the personalized record to be viewed on the receiving device.

21. The method of claim 20, wherein the capability is an Internet bandwidth capability.

22. The method of claim 20, wherein the combining is selected from a group consisting of: merging; inserting; overlaying; replacing; and a combination of the above.

23. The method of claim 20, wherein the personal information is a medical record of the person and the receiving device is a patient receiving device.

24. The method of claim 20, wherein the video relates to a medical diagnosis including a description of symptoms and treatment information.

25. The method of claim 20, wherein the personalized information combined with the video at the insertion points is selected from a group consisting: patient-specific conditions; patient-specific symptoms; a physician order entry; historic patient data; data from a patient's EMR; medical images, customized drug information; customized care information; and a combination of the above.

26. The method of claim 20, wherein the user is associated with a medical or healthcare facility.

27. A method of distributing a personalized record over a network to a remote receiving device, the method comprising:
providing network access to an associated receiving device and sensing a capability of the associated receiving device;
receiving personal information of a person at a central computer sent from an electronic device interfaced to the central computer, the central computer comprising a processor and a database that stores tags or profiles for creating a pool of videos for the user, wherein the processor;
selects a video based on the tags or profiles;
generates a script that transforms the video into a usable format having insertion points for combining the personal information with generic information in the video;
formats the script into a personalized video record by combining the personalized information at the insertion points in the script;
generates marked frames from the formatted personalized video record and generates a slide show using the marked frames in response to the sensed capability necessitating a different media type; and
transmits the slide show over the network to the receiving device;
wherein the slide show allows the personalized record to be transmitted to the associated receiving device and enables the personalized record to be viewed on the receiving device.

28. The method of claim 27 further comprising:
accompanying the slide show with an audio track from the video.

* * * * *